United States Patent
Kelly et al.

(10) Patent No.: US 10,853,498 B2
(45) Date of Patent: Dec. 1, 2020

(54) SECURE BOOT ORCHESTRATION DEVICE IN A VIRTUAL DESKTOP INFRASTRUCTURE

(71) Applicant: Dell Products L.P., Round Rock, TX (US)

(72) Inventors: John Bosco Kelly, Mallow (IE); Ricardo L. Martinez, Leander, TX (US)

(73) Assignee: Dell Products L.P., Round Rock, TX (US)

( * ) Notice: Subject to any disclaimer, the term of this patent is extended or adjusted under 35 U.S.C. 154(b) by 163 days.

(21) Appl. No.: 16/135,291

(22) Filed: Sep. 19, 2018

(65) Prior Publication Data
US 2020/0089888 A1    Mar. 19, 2020

(51) Int. Cl.
G06F 21/57    (2013.01)
H04L 9/32    (2006.01)
G06F 21/60    (2013.01)
G06F 9/451    (2018.01)

(52) U.S. Cl.
CPC ............ *G06F 21/575* (2013.01); *G06F 9/452* (2018.02); *G06F 21/604* (2013.01); *H04L 9/3234* (2013.01)

(58) Field of Classification Search
CPC ...... G06F 21/575; G06F 9/452; G06F 21/604; H04L 9/3234; H04L 9/3263; H04L 2209/26
See application file for complete search history.

(56) References Cited

U.S. PATENT DOCUMENTS

| | | | | |
|---|---|---|---|---|
| 2010/0318781 A1* | 12/2010 | Nicolson | ............... | G06F 21/575 713/2 |
| 2010/0325628 A1* | 12/2010 | Haga | ..................... | G06F 21/575 718/1 |
| 2011/0029974 A1* | 2/2011 | Broyles | ................... | G06F 21/57 718/1 |
| 2012/0137117 A1* | 5/2012 | Bosch | .................. | G06F 21/572 713/2 |
| 2012/0239729 A1* | 9/2012 | Hefter | ................. | G06F 9/45533 709/203 |
| 2013/0031374 A1* | 1/2013 | Thom | ................... | G06F 21/572 713/189 |
| 2013/0191622 A1* | 7/2013 | Sasaki | .................. | G06F 9/4406 713/2 |

(Continued)

OTHER PUBLICATIONS

IP.com Search Query; Apr. 24, 2020 (Year: 2020).*
IP.com Search Query Aug. 20, 2020 (Year: 2020).*

*Primary Examiner* — Taghi T Arani
*Assistant Examiner* — Blake I Narramore
(74) *Attorney, Agent, or Firm* — Baker Botts L.L.P.

(57) ABSTRACT

Methods, systems, and computer programs encoded on computer storage medium, for identifying a virtual desktop infrastructure (VDI) that includes a plurality of components; identifying a secure boot state of each of the components; aggregating the secure boot state of each of the components to define an aggregated secure boot state of the VDI; comparing the aggregated secure boot state of the VDI with a secure boot lookup table to identify a measure of trust of the VDI; identifying access control policies for the VDI for the identified measure of trust of the VDI; and enabling access to one or more resources based on the identified access control policies for the VDI.

18 Claims, 4 Drawing Sheets

(56) References Cited

U.S. PATENT DOCUMENTS

| | | | | |
|---|---|---|---|---|
| 2013/0311990 A1* | 11/2013 | Tang | ............ | G06F 9/45558 |
| | | | | 718/1 |
| 2013/0339949 A1* | 12/2013 | Spiers | ............ | G06F 9/45558 |
| | | | | 718/1 |
| 2014/0013327 A1* | 1/2014 | Sherwood | ............ | G06F 11/1484 |
| | | | | 718/1 |
| 2015/0135311 A1* | 5/2015 | MacKintosh | ............ | G06F 21/577 |
| | | | | 726/22 |
| 2015/0149757 A1* | 5/2015 | Brown | ............ | G06F 21/74 |
| | | | | 713/2 |
| 2016/0210457 A1* | 7/2016 | Cleeton | ............ | G06F 21/60 |
| 2016/0378534 A1* | 12/2016 | Oh | ............ | G06F 9/45558 |
| | | | | 718/1 |

\* cited by examiner

SECURE BOOT ORCHESTRATION DEVICE IN A VIRTUAL DESKTOP INFRASTRUCTURE

BACKGROUND

Field of the Disclosure

The disclosure relates generally to information handling systems, and, more particularly, to a system and method for secure boot orchestration of information handling systems.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

SUMMARY

Innovative aspects of the subject matter described in this specification may be embodied in methods that includes identifying a virtual desktop infrastructure (VDI) that includes a plurality of components; identifying a secure boot state of each of the components; aggregating the secure boot state of each of the components to define an aggregated secure boot state of the VDI; comparing the aggregated secure boot state of the VDI with a secure boot lookup table to identify a measure of trust of the VDI; identifying access control policies for the VDI for the identified measure of trust of the VDI; and enabling access to one or more resources based on the identified access control policies for the VDI.

Other embodiments of these aspects include corresponding system, apparatus, and computer programs, configured to perform the actions of the methods, encoded on computer storage devices.

These and other embodiments may each optionally include one or more of the following features. For instance, the plurality of components includes at least a hypervisor, a virtual desktop, and a virtual desktop access device. Identifying the secure boot state of each of the components includes querying, for each of the components, a secure boot database associated with the component. The secure boot state of each of the components can include i) a secure boot enabled state, ii) a secure boot capable state, iii) a secure boot not supported state, and iv) a unable to detect secure boot state. Identifying the secure boot state of each of the components includes: identifying a certificate signature associated with the secure boot state of the component; and identifying a source of the certificate signature associated with the secure boot state of the component, wherein the aggregated secure boot state of the VDI is further based on the source of the certificate signature associated with the secure boot state of at least one or more of the components. Identifying the certificate signature associated with the secure boot state of the component includes only identifying the certification signature associated with a secure boot enabled state of the component.

The features can further include receiving, from a trusted platform module (TPM), secure boot state data associated each of the components; comparing, for each of the components, the received secure boot state data with the identified secure boot state; matching, based on the comparing and for each of the components, the received secure boot state data with the identified secure boot state; and in response to matching the received secure boot state data with the identified secure boot state, enabling access to the one or more resources based on the identified access control policies for the VDI. In response to comparing the aggregated secure boot state of the VDI with a secure boot lookup table to identify a measure of trust of the VDI, increasing the measure of trust of the VDI by providing a notification to a virtual desktop access device of the VDI indicating that at least one of the components of the VDI does not include a secure boot enabled state. In response to comparing the aggregated secure boot state of the VDI with a secure boot lookup table to identify a measure of trust of the VDI, updating a secure boot policy of one or more of the components of the VDI. The secure boot state of each of the components is identified when one or more of the components of the VDI is booted. The secure boot state of each of the components is identified periodically.

The details of one or more embodiments of the subject matter described in this specification are set forth in the accompanying drawings and the description below. Other potential features, aspects, and advantages of the subject matter will become apparent from the description, the drawings, and the claims.

DESCRIPTION OF PARTICULAR EMBODIMENT(S)

This document describes methods, systems, and computer readable medium for secure boot state aggregation. Specifically, a virtual desktop infrastructure (VDI) can include three bootable components that contribute to the overall user environment: i) a hypervisor, ii) a virtual desktop, and iii) a virtual desktop access device, e.g., the endpoint. These components can create a computing paradigm that results in new "attack surface" opportunities for malware. This is due to the potential to target just one component and then pivot or propagate through the remaining components in the VDI.

A secure boot feature can mitigate the threat of bootloader-based malware within the VDI by establishing a multi-level verified trust tiered system to provide device access controls that leverage the security of the secure boot feature throughout the three bootable components of the VDI.

To that end, to provide such features, a secure boot orchestration device facilitates a hierarchical secure boot verification at the time of connection between the various devices in the VDI. This single point of evaluation of the secure boot status and policies across the VDI allows the secure boot orchestration device to quantify a measure of trust for the endpoint user and define specific access control policies based on this trust.

In the following description, details are set forth by way of example to facilitate discussion of the disclosed subject matter. It should be apparent to a person of ordinary skill in the field, however, that the disclosed embodiments are exemplary and not exhaustive of all possible embodiments.

For the purposes of this disclosure, an information handling system may include an instrumentality or aggregate of instrumentalities operable to compute, classify, process, transmit, receive, retrieve, originate, switch, store, display, manifest, detect, record, reproduce, handle, or utilize various forms of information, intelligence, or data for business, scientific, control, entertainment, or other purposes. For example, an information handling system may be a personal computer, a PDA, a consumer electronic device, a network storage device, or another suitable device and may vary in size, shape, performance, functionality, and price. The information handling system may include memory, one or more processing resources such as a central processing unit (CPU) or hardware or software control logic. Additional components of the information handling system may include one or more storage devices, one or more communications ports for communicating with external devices as well as various input and output (I/O) devices, such as a keyboard, a mouse, and a video display. The information handling system may also include one or more buses operable to transmit communication between the various hardware components.

For the purposes of this disclosure, computer-readable media may include an instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory (SSD); as well as communications media such wires, optical fibers, microwaves, radio waves, and other electromagnetic and/or optical carriers; and/or any combination of the foregoing.

Particular embodiments are best understood by reference to FIGS. 1-4 wherein like numbers are used to indicate like and corresponding parts.

Figure 1:
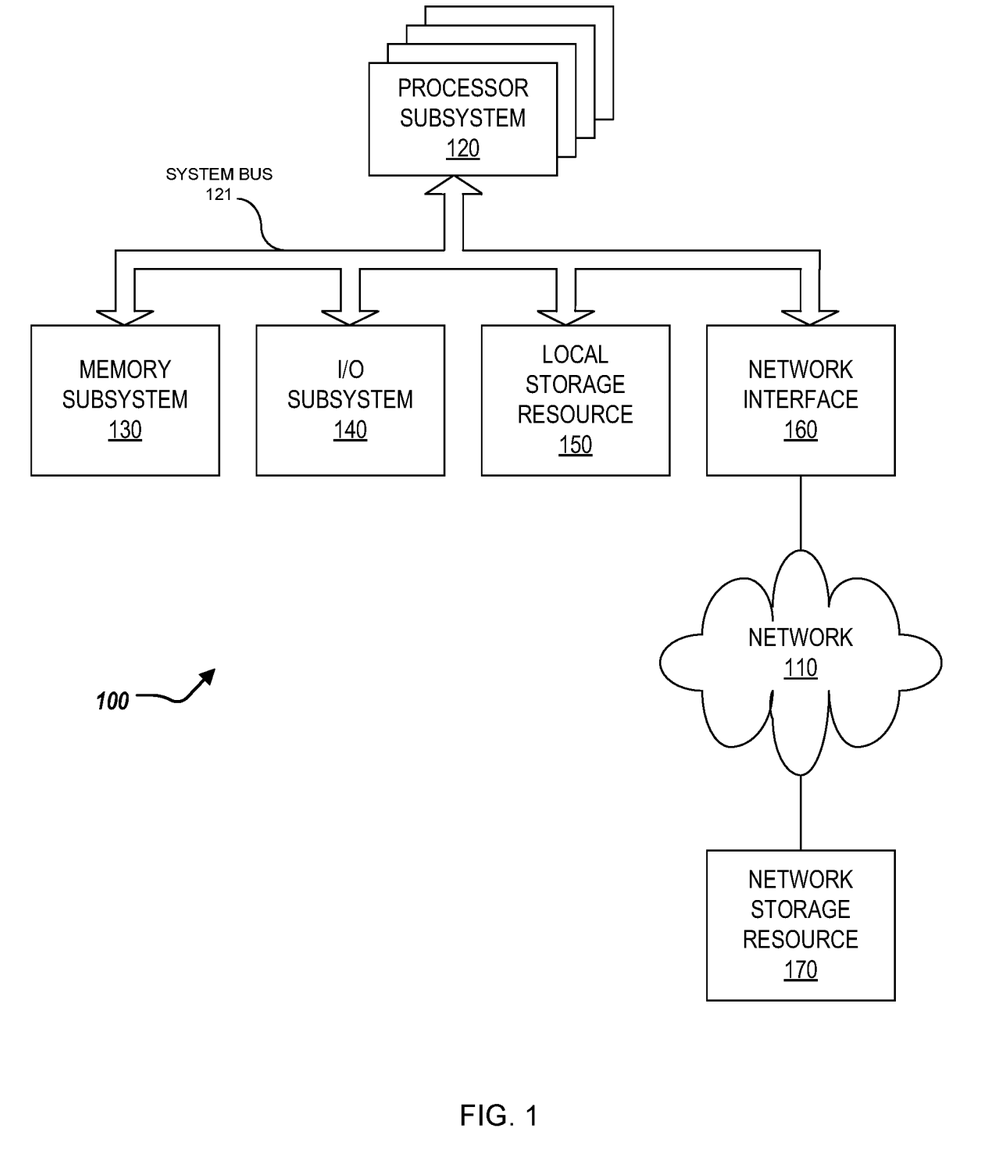
FIG. 1 is a block diagram of selected elements of an embodiment of an information handling system.

Turning now to the drawings, FIG. 1 illustrates a block diagram depicting selected elements of an information handling system 100 in accordance with some embodiments of the present disclosure. In various embodiments, information handling system 100 may represent different types of portable information handling systems, such as, display devices, head mounted displays, head mount display systems, smart phones, tablet computers, notebook computers, media players, digital cameras, 2-in-1 tablet-laptop combination computers, and wireless organizers, or other types of portable information handling systems. In one or more embodiments, information handling system 100 may also represent other types of information handling systems, including desktop computers, server systems, controllers, and microcontroller units, among other types of information handling systems. Components of information handling system 100 may include, but are not limited to, a processor subsystem 120, which may comprise one or more processors, and system bus 121 that communicatively couples various system components to processor subsystem 120 including, for example, a memory subsystem 130, an I/O subsystem 140, a local storage resource 150, and a network interface 160. System bus 121 may represent a variety of suitable types of bus structures, e.g., a memory bus, a peripheral bus, or a local bus using various bus architectures in selected embodiments. For example, such architectures may include, but are not limited to, Micro Channel Architecture (MCA) bus, Industry Standard Architecture (ISA) bus, Enhanced ISA (EISA) bus, Peripheral Component Interconnect (PCI) bus, PCI-Express bus, HyperTransport (HT) bus, and Video Electronics Standards Association (VESA) local bus.

As depicted in FIG. 1, processor subsystem 120 may comprise a system, device, or apparatus operable to interpret and/or execute program instructions and/or process data, and may include a microprocessor, microcontroller, digital signal processor (DSP), application specific integrated circuit (ASIC), or another digital or analog circuitry configured to interpret and/or execute program instructions and/or process data. In some embodiments, processor subsystem 120 may interpret and/or execute program instructions and/or process data stored locally (e.g., in memory subsystem 130 and/or another component of information handling system). In the same or alternative embodiments, processor subsystem 120 may interpret and/or execute program instructions and/or process data stored remotely (e.g., in network storage resource 170).

Also in FIG. 1, memory subsystem 130 may comprise a system, device, or apparatus operable to retain and/or retrieve program instructions and/or data for a period of time (e.g., computer-readable media). Memory subsystem 130 may comprise random access memory (RAM), electrically erasable programmable read-only memory (EEPROM), a PCMCIA card, flash memory, magnetic storage, opto-magnetic storage, and/or a suitable selection and/or array of volatile or non-volatile memory that retains data after power to its associated information handling system, such as system 100, is powered down.

In information handling system 100, I/O subsystem 140 may comprise a system, device, or apparatus generally operable to receive and/or transmit data to/from/within information handling system 100. I/O subsystem 140 may represent, for example, a variety of communication interfaces, graphics interfaces, video interfaces, user input interfaces, and/or peripheral interfaces. In various embodiments, I/O subsystem 140 may be used to support various peripheral devices, such as a touch panel, a display adapter, a keyboard, an accelerometer, a touch pad, a gyroscope, an IR sensor, a microphone, a sensor, or a camera, or another type of peripheral device.

Local storage resource 150 may comprise computer-readable media (e.g., hard disk drive, floppy disk drive, CD-ROM, and/or other type of rotating storage media, flash memory, EEPROM, and/or another type of solid state storage media) and may be generally operable to store instructions and/or data. Likewise, the network storage resource may comprise computer-readable media (e.g., hard disk drive, floppy disk drive, CD-ROM, and/or other type of rotating storage media, flash memory, EEPROM, and/or other type of solid state storage media) and may be generally operable to store instructions and/or data.

In FIG. 1, network interface 160 may be a suitable system, apparatus, or device operable to serve as an interface between information handling system 100 and a network 110. Network interface 160 may enable information handling system 100 to communicate over network 110 using a suitable transmission protocol and/or standard, including, but not limited to, transmission protocols and/or standards enumerated below with respect to the discussion of network 110. In some embodiments, network interface 160 may be communicatively coupled via network 110 to a network storage resource 170. Network 110 may be a public network or a private (e.g. corporate) network. The network may be implemented as, or may be a part of, a storage area network (SAN), personal area network (PAN), local area network (LAN), a metropolitan area network (MAN), a wide area network (WAN), a wireless local area network (WLAN), a virtual private network (VPN), an intranet, the Internet or another appropriate architecture or system that facilitates the communication of signals, data and/or messages (generally referred to as data). Network interface 160 may enable wired and/or wireless communications (e.g., NFC or Bluetooth) to and/or from information handling system 100.

In particular embodiments, network 110 may include one or more routers for routing data between client information handling systems 100 and server information handling systems 100. A device (e.g., a client information handling system 100 or a server information handling system 100) on network 110 may be addressed by a corresponding network address including, for example, an Internet protocol (IP) address, an Internet name, a Windows Internet name service (WINS) name, a domain name or other system name. In particular embodiments, network 110 may include one or more logical groupings of network devices such as, for example, one or more sites (e.g. customer sites) or subnets. As an example, a corporate network may include potentially thousands of offices or branches, each with its own subnet (or multiple subnets) having many devices. One or more client information handling systems 100 may communicate with one or more server information handling systems 100 via any suitable connection including, for example, a modem connection, a LAN connection including the Ethernet or a broadband WAN connection including DSL, Cable, Ti, T3, Fiber Optics, Wi-Fi, or a mobile network connection including GSM, GPRS, 3G, or WiMax.

Network 110 may transmit data using a desired storage and/or communication protocol, including, but not limited to, Fibre Channel, Frame Relay, Asynchronous Transfer Mode (ATM), Internet protocol (IP), other packet-based protocol, small computer system interface (SCSI), Internet SCSI (iSCSI), Serial Attached SCSI (SAS) or another transport that operates with the SCSI protocol, advanced technology attachment (ATA), serial ATA (SATA), advanced technology attachment packet interface (ATAPI), serial storage architecture (SSA), integrated drive electronics (IDE), and/or any combination thereof. Network 110 and its various components may be implemented using hardware, software, or any combination thereof.

Figure 2:
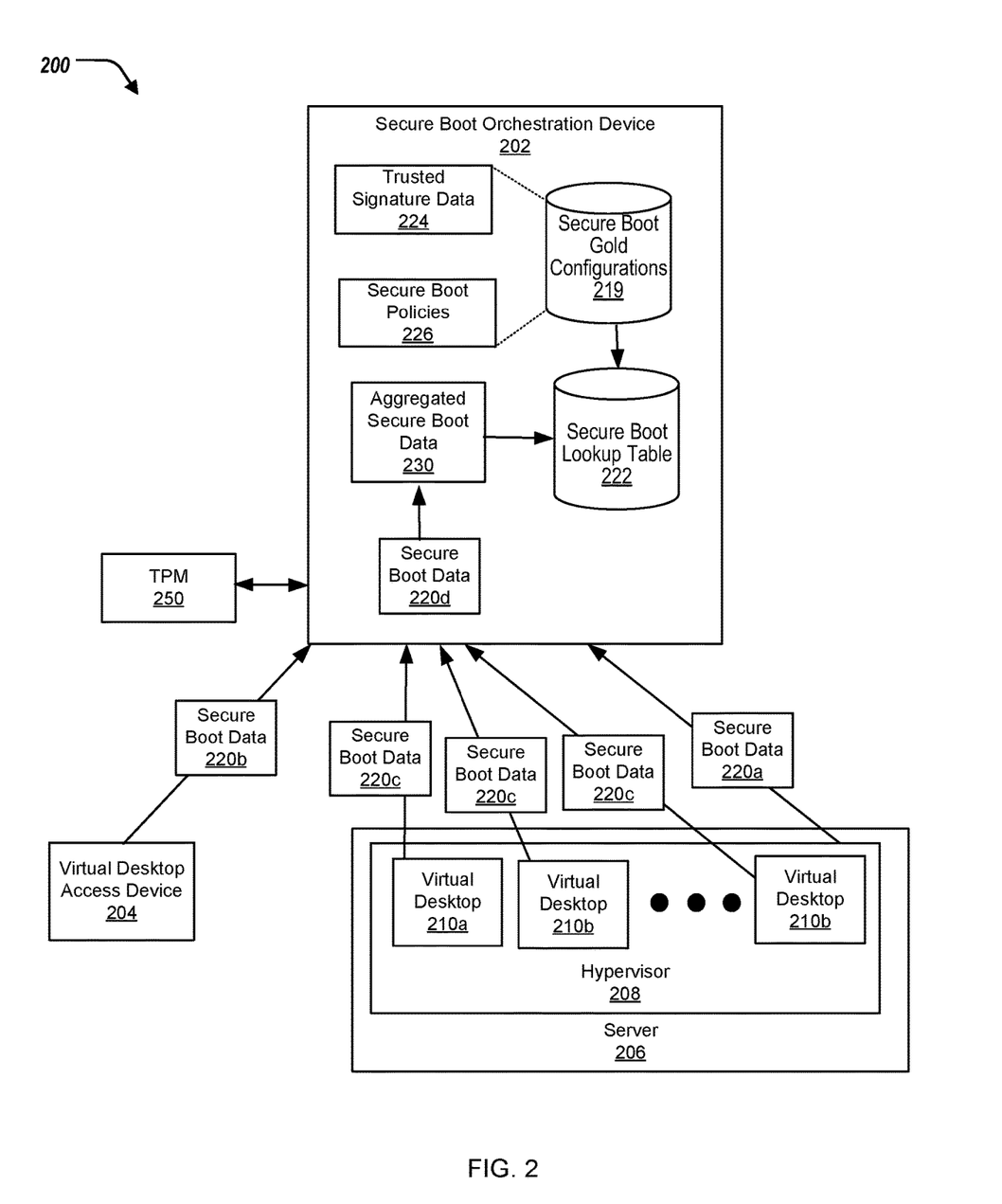
FIG. 2 illustrates an environment for secure boot state aggregation.

Turning now to FIG. 2, FIG. 2 depicts a computing environment 200. The environment includes a secure boot orchestration device 202, a virtual desktop access device 204, and a server computing device 206. The server computing device 206 can include a hypervisor 208 that can manage a plurality of virtual desktops 210a, 210b, . . . , 210n (collectively referred to as virtual desktops 210). In some examples, the secure boot orchestration device 202 can include the information handling system 100.

The secure boot orchestration device 202 can include a secure boot gold configurations database 219 and a secure boot lookup table 222. The secure boot gold configuration database 219 can include trusted signature data 224 and secure boot policies data 226. In some examples, the data 224, 226 can be defined by an administrator (user) of the secure boot orchestration device 202, and can define particular certificate signatures that are trusted, as well as secure boot policies that are trusted. The secure boot lookup table 222 can include, or have access to, data included by the secure boot gold configurations database 219 for facilitating access control policy identification and enablement, described further therein.

In some implementations, the secure boot orchestration device 202 can identify a virtual desktop infrastructure (VDI) that includes a plurality of components. In some examples, the VDI can include a portion of the environment 200, and namely, include the hypervisor 208, the virtual desktop access device 204, and the virtual desktops 210. That is, the components of the VDI can include the hypervisor 208, the virtual desktop access device 204, and the virtual desktops 210. The secure boot orchestration device 202 can then identify a secure boot state of each of the hypervisor 208, the virtual desktop access device 204, and one or more of the virtual desktops 210 (e.g., the virtual desktop 210 currently being utilized). The secure boot can include a protocol which can secure the boot process by preventing the loading of drivers or OS loaders that are not signed with an acceptable digital signature.

Specifically, each of the hypervisor 208, the virtual desktop access device 204, and the virtual desktops 210 include (or are in communication with) a respective secure boot database (not shown for ease of illustration). The secure boot database for each of the hypervisor 208, the virtual desktop access device 204, and the virtual desktops 210 stores boot state data associated with the respective hypervisor 208, the virtual desktop access device 204, and the virtual desktops 210. To that end, the secure boot orchestration device 202 can identify the secure boot state of each of the hypervisor 208, the virtual desktop access device 204, and the virtual desktops 210 by querying the respective secure boot databases. Specifically, after querying each of the respective secure boot databases of the hypervisor 208, the virtual desktop access device 204, and the virtual desktops 210, the secure boot orchestration device 202 receives secure boot data 220a from the hypervisor 208, secure boot data 220b from the virtual desktop access device 204, and secure boot data 220c from the virtual desktops 210 (collectively referred to as secure boot data 220).

In some examples, the secure boot orchestration device 202 can identify the secure boot state of itself. That is, the secure boot orchestration device 202 identifies the secure boot state 220d of itself (and stored by a corresponding secure boot database). In some examples, the secure boot orchestration device 202 can identify the secure boot state of the server 240. That is, the secure boot orchestration device 202 identities the secure boot state (not shown) of the server computing device 206.

In some examples, the secure boot states 220 of each of the hypervisor 208, the virtual desktop access device 204, and the virtual desktops 210 can include one of i) a secure boot enabled state (approved/verified keys), ii) a secure boot capable state (secure boot disabled or non-approved keys), iii) a secure boot not supported state, and iv) a unable to detect secure boot state.

In some examples, the secure boot orchestration device 202 can identify the secure boot states 220a, 220b, 220c of the hypervisor 208, the virtual desktop access device 204, and the virtual desktops 210, respectively using Unified Extensible Firmware Interface (UEFI) variable system calls. That is, the secure boot orchestration device 202 can identify the secure boot states 220a, 220b, 220c, respectively, of the hypervisor 208, the virtual desktop access device 204, and the virtual desktops 210 by reading the respective databases using an UEFI API.

In some examples, the secure boot orchestration device 202 can identify a certificate signature of each of the hypervisor 208, the virtual desktop access device 204, and the virtual desktop 210 (e.g., one of the virtual desktop 210 currently being utilized). To that end, the certificate signature for each hypervisor 208, the virtual desktop access device 204, and the virtual desktop 210 can indicate a source of the certificate signature associated with each of the hypervisor 208, the virtual desktop access device 204, and the virtual desktop 210. That is, the secure boot state 220a, 220b, 220c of each of the hypervisor 208, the virtual desktop access device 204, and the virtual desktops 210, respectively, can further be based on the respective certificate signature, and further, the source of the respective certificate signature. The source of the certificate signature associated with one of the hypervisor 208, the virtual desktop access device 204, and the virtual desktop 210 can be a known certificate authority or self-signed. In some examples, the secure boot orchestration device 202 only identifies the certificate signature associated with components (e.g., the hypervisor 208, the virtual desktop access device 204, and the virtual desktops 210) that includes a secure boot enabled state.

In some examples, the secure boot orchestration device 202 identifies the secure boot state of the hypervisor 208, the virtual desktop access device 204, and the virtual desktop 210, respectively, when one or more of the hypervisor 208, the virtual desktop access device 204, and the virtual desktop 210 are booted up. However, the secure boot orchestration device 202 can also identify the secure boot states 220 periodically (e.g., every x minutes, or when one of the secure boot orchestration device 202 identifies the secure boot state of the hypervisor 208, the virtual desktop access device 204, and the virtual desktop 210 is rebooted).

In some implementations, the secure boot orchestration device 202 aggregates the secure boot state of each of the hypervisor 208, the virtual desktop access device 204, and the virtual desktop 210 to define an aggregate secure boot state data 230 of the VDI. That is, the secure boot orchestration device 202 aggregates the secure boot states 220a, 220b, 220c of each of the hypervisor 208, the virtual desktop access device 204, and the virtual desktop 210, respectively, and stores such as aggregated secure boot state data 230 in the secure boot lookup table 222. In some examples, the aggregated secure boot state data 230 can also include the secure boot state 220d of the secure boot orchestration device 202 and/or the secure boot state of the server 240.

In some examples, the aggregated source boot state data 230 of the VDI is further based on the source of the certificate signature associated with the secure boot state 220 of at least one of the hypervisor 208, the virtual desktop access device 204, and the virtual desktop 210. That is, the aggregated boot state data 230 of the VDI includes further granularity based on the source of the certificate signature. For example, for one or more of the secure boot states 220, the secure boot state 220 can include further information on whether the associated certificate signature is signed by a known certificate authority or is self-signed (e.g., by the respective hypervisor 208, the virtual desktop access device 204, and the virtual desktop 210).

Figure 3:
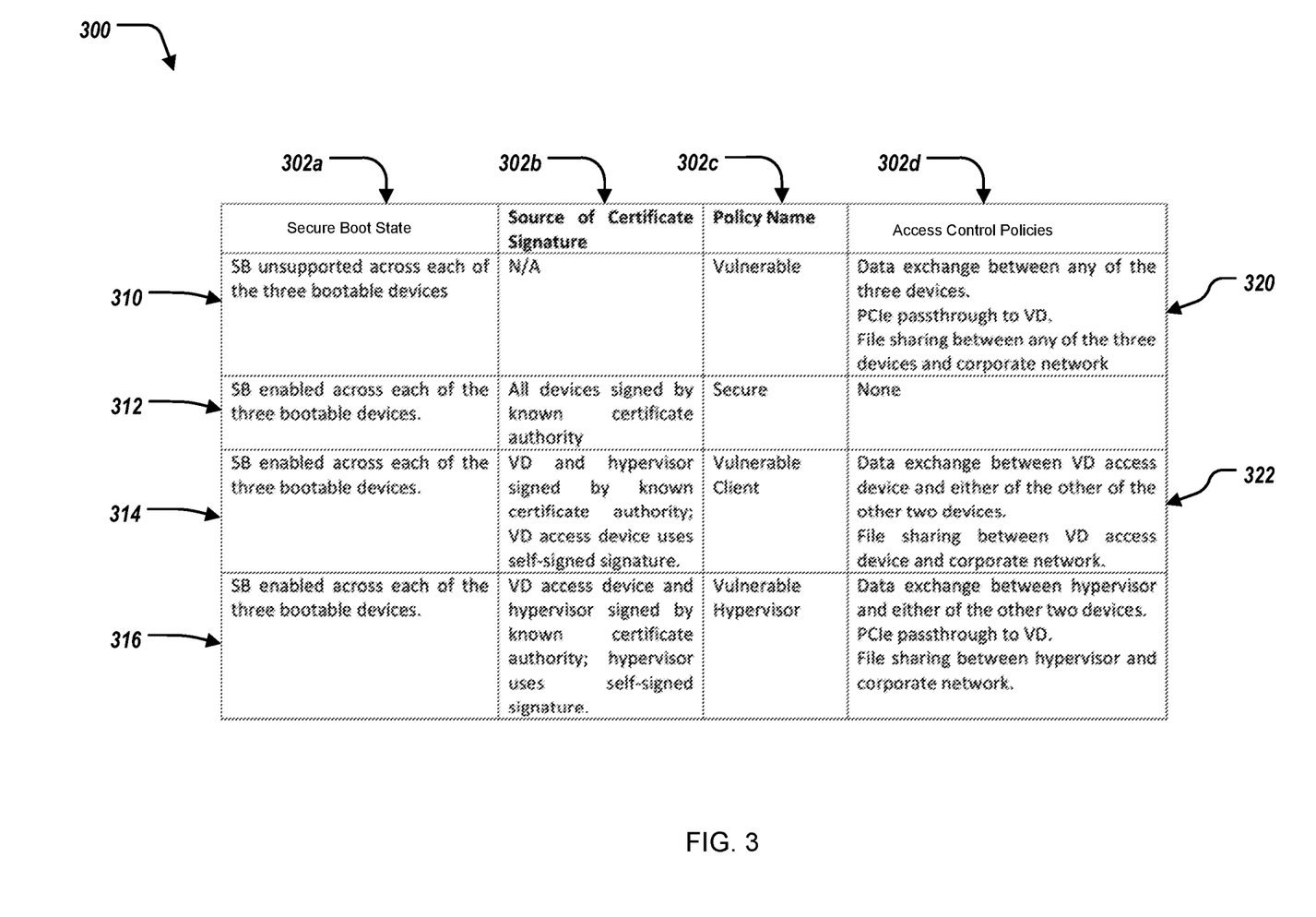
FIG. 3 illustrates a portion of a secure boot lookup table.

In some implementations, the secure boot orchestration device 202 compares the aggregated secure boot state data 230 of the VDI with the secure boot lookup table 222 to identify a measure of trust of the VDI. FIG. 3 illustrates a portion 300 of an example of the secure boot lookup table 222. The secure boot lookup table 222 includes four columns 302a, 302b, 302c, 302d. Column 302a corresponds to a secure boot state (e.g., the aggregated secure boot state data 230); column 302b corresponds to a source of certificate signature (e.g., a source of one or more of the secure boot states 220); column 302c corresponds to a policy name (or measure of trust); and column 302d corresponds to access control policies.

To that end, the secure boot orchestration device 202 identifies a corresponding row based on the aggregated secure boot state data 230 and, in some examples, the source of the secure boot states 220. Based on the row identified, the secure boot orchestration device 202 can identify the measure of trust that corresponds to the secure boot state data 230 and, in some examples, the source of the certificate signature of the secure boot states 220. In other words, the secure boot orchestration device 202 compares the aggregated secure boot state data 230 and the certificate signature data of the secure boot states 220 with the secure boot lookup table 222.

In the illustrated example, the secure boot lookup table 222 can include 64 rows of possible combinations of the aggregated secure boot state data 230. Specifically, the VDI can include 3 components (the hypervisor 208, the virtual desktop access device 204, and the virtual desktop 210) and each component can include one of 4 states (a secure boot enabled state, a secure boot capable state, a secure boot not supported state, and an unable to detect secure boot state). Thus, each state for each component yields 64 possible combinations of the aggregated secure boot state data 230.

In an example, the aggregated secure boot state data 230 can indicate that secure boot is unsupported across each of the three components (the hypervisor 208, the virtual desktop access device 204, and the virtual desktop 210). The secure boot orchestration device 202 compares such aggregated secure boot state data 230 with the secure boot lookup table 222 to identify a measure of trust of the VDI. That is, the secure boot orchestration device 202 identifies that such aggregated secure boot state data 230 corresponds to row 310 as column 302a corresponds to such aggregated secure boot state data 230. The secure boot orchestration device 202 then can identify that the corresponding measure of trust of the VDI is "vulnerable" as indicated by column 302c.

In some examples, as mentioned above, the secure boot orchestration device 202 can identify the measure of trust also based on the source of the certificate signature of the secure boot states 220. In an example, the aggregated secure boot state data 230 can indicate that secure boot is enabled across each of the three components (the hypervisor 208, the virtual desktop access device 204, and the virtual desktop 210). The secure boot orchestration device 202 compares such aggregated secure boot state data 230 with the secure boot lookup table 222. That is, the secure boot orchestrate device 202 identifies that such aggregated secure boot state data 230 corresponds to rows 312, 314, 316 as column 302a corresponds to such aggregated secure boot state data 230. The secure boot orchestration device 202 further refines the results based on the source of the certificate signature of the secure boot states 220. That is, the certificate signature of the secure boot state 220c of the virtual desktop 210 and the secure boot state 220a of the hypervisor 208 indicates that the respective certificates are signed by a known certificate authority; and that the certificate signature of the secure boot state 220b of the virtual desktop access device 204 is self-signed. Based on the source of the certificate signature of the secure boot states 220, the secure boot orchestration device 202 identifies the row 314 as column 302b corresponds to the certificate signature of the secure boot states 220 (the certificate signature of the secure boot state 220c of the virtual desktop 210 and the secure boot state 220a of the hypervisor indicates that the respective certificates are signed by a known certificate authority; and that the certificate signature of the secure boot state 220b of the virtual desktop access device 204 is self-signed). The secure boot orchestration device 202 can then identify that the corresponding measure of trust of the VDI is "vulnerable client" as indicated by column 302c.

In some implementations, the secure boot orchestration device 202 identifies access control policies for the VDI for the identified measure of trust of the VDI. Specifically, the secure boot lookup table 222 includes access control policies for each identified measure of trust of the VDI, as indicated by column 302d. The access control policies can include activities/actions that are enabled and/or disabled within the VDI. For example, such activities/actions that can be enabled or disabled include data exchange between any of the components of the VDI (e.g., the hypervisor 208, the virtual desktop access device 204, and the virtual desktop 210).

In an example, the secure boot orchestration device 202 identifies the measure of trust of the VDI to be "vulnerable" as indicated by column 302c. As a result, the secure boot orchestration device 202 identifies the access control policy 320 of column 302d that correspond to such measure of trust. The access control policy 320 can include that i) data exchange between any of the components of the VDI is disabled, ii) PCIe passthrough to the virtual desktop 210 is disabled, and iii) file sharing between any of the components of the VDI and a network (e.g., corporate network) is disabled.

In another example, the secure boot orchestration device 202 identifies the measure of trust of the VDI to be "vulnerable client" as indicated by column 302c. As a result, the secure boot orchestration device 202 identifies the access control policy 322 of column 302d that correspond to such measure of trust. The access control policy 322 can include that i) data exchange between the virtual desktop access device 204 and either of the hypervisor 208 and the virtual desktop is disabled, and ii) file sharing between the virtual desktop access device 204 and a network (e.g., corporate network) is disabled.

In some implementations, the secure boot orchestration device 202 enables access to resources based on the identified access control policies for the VDI. Specifically, the secure boot orchestration device 202 can enable, or disable, access to resources within the VDI. In some examples, the resources can include exchange of data between any of the components of the VDI (e.g., the hypervisor 208, the virtual desktop access device 204, and the virtual desktop 210).

In an example, when the access control policy includes access control policy 320, the secure boot orchestration device 202 disables i) data exchange between any of the components of the VDI, ii) PCIe passthrough to the virtual desktop 210, and iii) file sharing between any of the components of the VDI and a network (e.g., corporate network). In an example, when the access control policy includes access control policy 322, the secure boot orchestration device 202 disables i) data exchange between the virtual desktop access device 204 and either of the hypervisor 208 and the virtual desktop, and ii) file sharing between the virtual desktop access device 204 and a network (e.g., corporate network).

In some examples, the secure boot orchestration device 202 can receive, from a trusted platform module (TPM) 250, secure boot state data associated with the hypervisor 208, the virtual desktop access device 204, and the virtual desktop 210. Specifically, when any of the components of the VDI are booted, the secure boot data 220 is stored by the TPM 250. The TPM 250 can store such data persistently, and the data is sealed. To that end, the secure boot orchestration device 202 can compare, for each of the hypervisor 208, the virtual desktop access device 204, and the virtual desktop 210, the received secure boot state data (from the TPM 250) with the respective secure boot states 220. The secure boot orchestration device 202, based on such comparison, can match the received boot state data (from the TPM 250) with the secure boot states 220 to provide an additional level of verification (of boot state) from the secure boot orchestration device 202. In response to any such matching, the secure boot orchestration device 202 can enable access (or disable access) to the resource based on the identified access control policies for the VDI. That is, the secure boot orchestration device 202 can disable actions/activities such as data transfer based on the identified access control policies (e.g., access control policies 320, 322). By storing the secure boot state data additionally by the TPM 250, the TPM 250 provides verification of the secure boot states 220. In some examples, the TPM 250 can be included by the virtual desktop access device 240.

In some examples, the secure boot orchestration device 202 can trigger actions to attempt to increase the measure of trust of the VDI. Specifically, the secure boot orchestration device 202, in response to comparing the aggregated secure boot state data 230 of the VDI with the secure boot lookup table 222 to identify the measure of trust of the VDI, can increase the measure of trust of the VDI by providing a notification to the virtual desktop access device 204 indicating that at least one of the components of the VDI (e.g., the hypervisor 208, the virtual desktop access device 204, and the virtual desktop 210) does not include a secure boot enabled state. The notification can further recommend to the user of the virtual desktop access device 204 to enable the secure boot state of the appropriate components.

In another example, the secure boot orchestration device 202, in response to comparing the aggregated secure boot state data 230 of the VDI with the secure boot lookup table 222 to identify the measure of trust of the VDI, can update a secure boot policy of one or more of the components of the VDI (e.g., the hypervisor 208, the virtual desktop access device 204, and the virtual desktop 210). That is, the secure boot orchestration device 202 can push the secure boot policy to the appropriate component to target a specific measure of trust with necessary configuration information.

Figure 4:
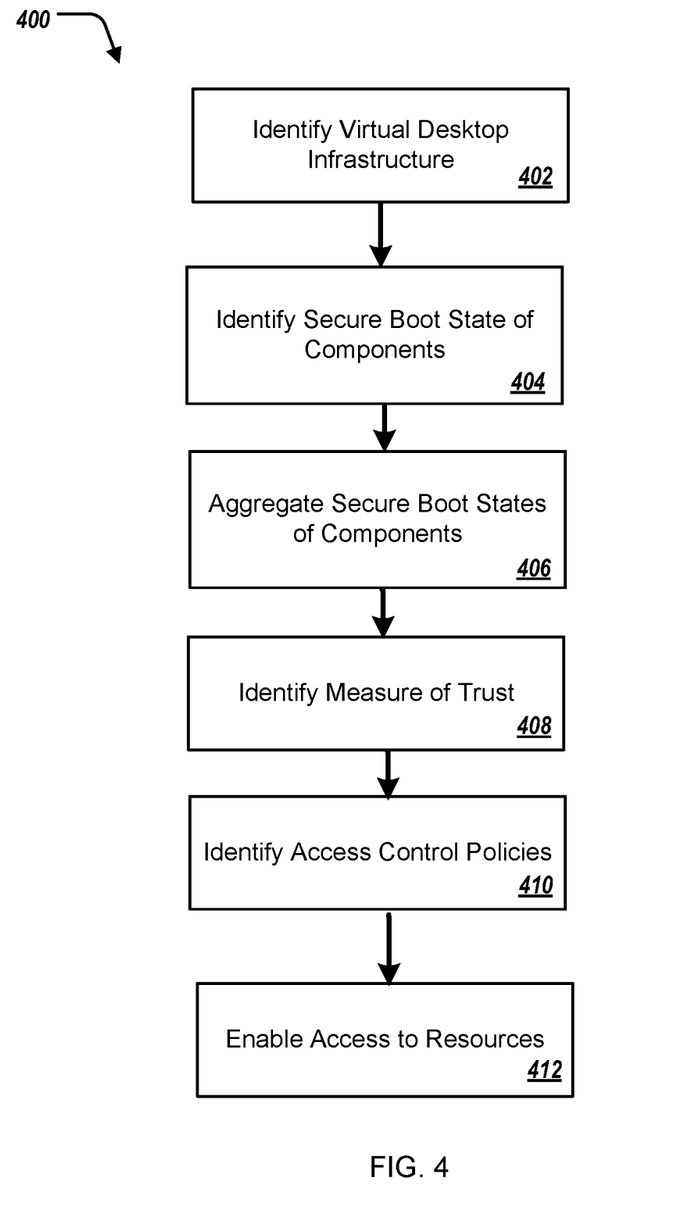
FIG. 4 illustrates a flowchart for secure boot state aggregation.

FIG. 4 illustrates a flowchart depicting selected elements of an embodiment of a method 300 for secure boot state aggregation. The method 400 may be performed by the information handling system 100 and/or the secure boot orchestration device 202 described herein with reference to FIGS. 1 and 2, or another information handling system. It is noted that certain operations described in method 400 may be optional or may be rearranged in different embodiments.

The secure boot orchestration device 202 can identify a virtual desktop infrastructure (VDI) that includes a plurality of components (402). The VDI can include a portion of the environment 200, and namely, including the hypervisor 208, the virtual desktop access device 204, and the virtual desktops 210. The secure boot orchestration device 202 can identify a secure boot state of each of the hypervisor 208, the virtual desktop access device 204, and the virtual desktop 210 (404). The secure boot database for each of the hypervisor 208, the virtual desktop access device 204, and the virtual desktop 210 stores boot state data associated with the respective hypervisor 208, the virtual desktop access device 204, and the virtual desktop 210. The secure boot orchestration device 202 can identify the secure boot state of each of the hypervisor 208, the virtual desktop access device 204, and the virtual desktop 210 by querying the respective secure boot databases. The secure boot orchestration device 202 aggregates the secure boot state of each of the hypervisor 208, the virtual desktop access device 204, and the virtual desktop 210 to define aggregate secure boot state data 230 of the VDI (406). That is, the secure boot orchestration device 202 aggregates the secure boot states 220a, 220b, 220c of each of the hypervisor 208, the virtual desktop access device 204, and the virtual desktop 210, respectively, and stores such as aggregated secure boot state data 230 in the secure boot lookup table 222.

The secure boot orchestration device 202 compares the aggregated secure boot state data 230 of the VDI with the secure boot lookup table 222 to identify a measure of trust of the VDI (408). The secure boot orchestration device 202 compares the aggregated secure boot state data 230 and the certificate signature data of the secure boot states 220 with the secure boot lookup table 222. The secure boot orchestration device 202 identifies access control policies for the VDI for the identified measure of trust of the VDI (410). The access control policies can include activities/actions that are enabled and/or disabled within the VDI. For example, such activities/actions that can be enabled or disabled include data exchange between any of the components of the VDI (e.g., the hypervisor 208, the virtual desktop access device 204, and the virtual desktop 210). The secure boot orchestration device 202 enables access to resources based on the identified access control policies for the VDI (412). Specifically, the secure boot orchestration device 202 can enable, or disable, access to resources within the VDI.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated other-wise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, features, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A computer-implemented method, comprising: identifying a virtual desktop infrastructure (VDI) that includes a plurality of components and sources of certifications corresponding to the plurality of components; identifying a secure boot state of each of the components; aggregating the secure boot state of each of the components to define an aggregated secure boot state of the VDI; identifying, for each component of the plurality of components, a source of a certification signature corresponding to the secure boot state of the component, the source including a self-signed signature and a known certificate authority; identifying, for the aggregated secure boot state, a particular combination of the sources of the certifications corresponding to each of the components defining the secure boot state; comparing i) the aggregated secure boot state of the VDI and ii) the particular combination of the sources of the certifications for the aggregated secure boot state with a secure boot lookup table to identify a measure of trust of the VDI; identifying access control policies for the VDI for the identified measure of trust of the VDI; and enabling access to one or more resources based on the identified access control policies for the VDI.

2. The computer-implemented method of claim 1, wherein the plurality of components includes at least a hypervisor, a virtual desktop, and a virtual desktop access device.

3. The computer-implemented method of claim 1, wherein identifying the secure boot state of each of the components includes querying, for each of the components, a secure boot database corresponding to the component.

4. The computer-implemented method of claim 1, wherein the secure boot state of each of the components can include one of the following: i) a secure boot enabled state, ii) a secure boot capable state, iii) a secure boot not supported state, and iv) an unable to detect secure boot state.

5. The computer-implemented method of claim 1, wherein identifying, for each component of the plurality of components, the source of the certificate signature corresponding to the secure boot state of the component includes only identifying the certification signature corresponding to a secure boot enabled state of the component.

6. The computer-implemented method of claim 1, further comprising: receiving, from a trusted platform module (TPM), secure boot state data associated each of the components; comparing, for each of the components, the received secure boot state data with the identified secure boot state; matching, based on the comparing and for each of the components, the received secure boot state data with the identified secure boot state; and in response to matching the received secure boot state data with the identified secure boot state, enabling access to the one or more resources based on the identified access control policies for the VDI.

7. The computer-implemented method of claim 1, further comprising: in response to comparing i) the aggregated secure boot state of the VDI and ii) the particular combination of the sources of the certifications for the aggregated secure boot state with the secure boot lookup table to identify a measure of trust of the VDI, increasing the measure of trust of the VDI by providing a notification to a virtual desktop access device of the VDI indicating that at least one of the components of the VDI does not include a secure boot enabled state.

8. The computer-implemented method of claim 1, further comprising: in response to comparing i) the aggregated secure boot state of the VDI and ii) the particular combination of the sources of the certifications for the aggregated secure boot state with the secure boot lookup table to identify a measure of trust of the VDI, updating a secure boot policy of one or more of the components of the VDI.

9. The computer-implemented method of claim 1, wherein the secure boot state of each of the components is identified when one or more of the components of the VDI is booted.

10. The computer-implemented method of claim 1, wherein the secure boot state of each of the components is identified periodically.

11. A system comprising a processor having access to memory media storing instructions executable by the processor to perform operations comprising: identifying a virtual desktop infrastructure (VDI) that includes a plurality of components and sources of certifications corresponding to the plurality of components; identifying a secure boot state of each of the components; aggregating the secure boot state of each of the components to define an aggregated secure boot state of the VDI; identifying, for each component of the plurality of components, a source of a certification signature corresponding to the secure boot state of the component, the source including a self-signed signature and a known certificate authority; identifying, for the aggregated secure boot state, a particular combination of the sources of the certifications corresponding to each of the components defining the secure boot state; comparing i) the aggregated secure boot state of the VDI and ii) the particular combination of the sources of the certifications for the aggregated secure boot state with a secure boot lookup table to identify a measure of trust of the VDI; identifying access control policies for the VDI for the identified measure of trust of the VDI; and enabling access to one or more resources based on the identified access control policies for the VDI.

12. The system of claim 11, wherein the plurality of components includes at least a hypervisor, a virtual desktop, and a virtual desktop access device.

13. The system of claim 11, wherein identifying the secure boot state of each of the components includes querying, for each of the components, a secure boot database corresponding to the component.

14. The system of claim 11, wherein the secure boot state of each of the components can include one of the following: i) a secure boot enabled state, ii) a secure boot capable state, iii) a secure boot not supported state, and iv) an unable to detect secure boot state.

15. The system of claim 11, wherein identifying, for each component of the plurality of components, the source of the certificate signature corresponding to the secure boot state of the component includes only identifying the certification signature corresponding to a secure boot enabled state of the component.

16. The system of claim 11, the operations further comprising: receiving, from a trusted platform module (TPM), secure boot state data associated each of the components; comparing, for each of the components, the received secure boot state data with the identified secure boot state; matching, based on the comparing and for each of the components, the received secure boot state data with the identified secure boot state; and in response to matching the received secure boot state data with the identified secure boot state, enabling access to the one or more resources based on the identified access control policies for the VDI.

17. The system of claim 11, the operations further comprising: in response to comparing i) the aggregated secure boot state of the VDI and ii) the particular combination of the sources of the certifications for the aggregated secure boot state with the secure boot lookup table to identify a measure of trust of the VDI, increasing the measure of trust of the VDI by providing a notification to a virtual desktop access device of the VDI indicating that at least one of the components of the VDI does not include a secure boot enabled state.

18. A non-transitory computer-readable medium storing software comprising instructions executable by one or more computers which, upon such execution, cause the one or more computers to perform operations comprising: identifying a virtual desktop infrastructure (VDI) that includes a plurality of components and sources of certifications corresponding to the plurality of components; identifying a secure boot state of each of the components; aggregating the secure boot state of each of the components to define an aggregated secure boot state of the VDI; identifying, for each component of the plurality of components, a source of a certification signature corresponding to the secure boot state of the component, the source including a self-signed signature and a known certificate authority; identifying, for the aggregated secure boot state, a particular combination of the sources of the certifications corresponding to each of the components defining the secure boot state; comparing i) the aggregated secure boot state of the VDI and ii) the particular combination of the sources of the certifications for the aggregated secure boot state with a secure boot lookup table to identify a measure of trust of the VDI; identifying access control policies for the VDI for the identified measure of trust of the VDI; and enabling access to one or more resources based on the identified access control policies for the VDI.

* * * * *